United States Patent [19]
Nishii et al.

[11] Patent Number: 6,062,655
[45] Date of Patent: May 16, 2000

[54] HYDRAULIC BRAKE APPARATUS FOR A VEHICLE

[75] Inventors: Michiharu Nishii; Masaki Oishi; Kyousuke Hata, all of Toyota; Hideki Yamamoto, Anjo, all of Japan

[73] Assignee: Aisin Seiki Kabushiki Kaisha, Kariya, Japan

[21] Appl. No.: 09/107,293

[22] Filed: Jun. 30, 1998

[30] Foreign Application Priority Data

Jun. 30, 1997 [JP] Japan .................................. 9-190404
Jun. 30, 1997 [JP] Japan .................................. 9-190627
Jun. 30, 1997 [JP] Japan .................................. 9-190703

[51] Int. Cl.$^7$ ........................................................ B60T 8/34
[52] U.S. Cl. ................................... 303/113.4; 303/115.4; 303/116.1; 60/552
[58] Field of Search ............................ 303/10, 11, 114.1, 303/113.4, 115.4, 116.1, 155; 60/591, 552, 562; 91/376 R

[56] References Cited

U.S. PATENT DOCUMENTS

| 3,928,970 | 12/1975 | Farr | 60/562 |
|---|---|---|---|
| 5,515,678 | 5/1996 | Kurokawa et al. | 60/591 |
| 5,851,057 | 12/1998 | Terazawa et al. | 303/113.4 |
| 5,924,530 | 7/1999 | Nishii et al. | 303/10 |
| 5,927,074 | 7/1999 | Nishii et al. | 303/11 |

FOREIGN PATENT DOCUMENTS 9-24818 1/1997 Japan .
9-24819 1/1997 Japan .
2 170 874 8/1986 United Kingdom .

*Primary Examiner*—Robert Oberleitner
*Assistant Examiner*—Mariano Sy
*Attorney, Agent, or Firm*—Burns, Doane, Swecker & Mathis, LLP

[57] ABSTRACT

The present invention is directed to a hydraulic brake apparatus for applying braking force to each wheel of a vehicle in response to depression of a brake pedal. A master piston is received in a cylinder body to define a pressure chamber ahead of the master piston and a power chamber behind it. An auxiliary pressure source is provided for pressurizing the brake fluid in a reservoir to discharge power pressure. A control piston is slidably disposed in the cylinder body ahead of the master piston to be movable in response to movement thereof, so that a regulator chamber is defined ahead of the control piston, and a rear end thereof is exposed to the pressure chamber. A first passage is adapted to communicate the auxiliary pressure source with the power chamber, and a second passage is adapted to communicate the power chamber with the reservoir through the regulator chamber. A pressure increase valve device is disposed in the first passage to open or close the first passage in response to movement of the control piston. And, a pressure decrease valve device is disposed in the second passage to open or close the second passage in response to movement of the control piston. Preferably, a one way valve is disposed in the first passage, and a pressure restriction device may be disposed in the second passage.

15 Claims, 13 Drawing Sheets

HYDRAULIC BRAKE APPARATUS FOR A VEHICLE

This application claims priority under 35 U.S.C. Sec. 119 to No. 9-190404, No. 9-190627 and No. 9-190703 filed in Japan on Jun. 30, 1997, the entire contents of which are herein incorporated by reference.

BACKGROUND OF THE INVENTION

1. Field of the Invention

The present invention relates to a hydraulic brake apparatus for supplying a hydraulic brake pressure to each wheel brake cylinder mounted on each wheel of a vehicle, and more particularly to the apparatus which is provided with a hydraulic pressure boosting device.

2. Description of the Related Arts

As for hydraulic brake apparatuses, various types are known and already on a market, including the apparatus of a type provided with a hydraulic pressure boosting device. For instance, the U.S. Pat. No. 3,928,970 discloses a power-assisted master cylinder using a source of fluid under pressure, which includes a piston movable in a cylinder bore, a pressure space ahead of the piston having an outlet for connection to a brake circuit, a power chamber behind the piston having an inlet for connection to the source of the fluid under pressure, and a control valve assembly for controlling the supply of fluid from the pressure source to the power chamber. It was the object of that patent to provide the assembly in which a piston is pedal operated but which does not require a movable inlet or inlet seals which move under pressure. And, there is disclosed a master cylinder assembly which includes a first piston and a second piston, between which a first pressure space is defined and connected to a hydraulic pressure circuit. Ahead of the second piston, a second pressure space is defined and connected to a space behind the first piston. An inlet valve member is provided for introducing the pressure discharged from the pressure source into the second pressure space, and an exhaust valve is provided for communicating the second pressure space with a reservoir, and these valve members are adapted to be actuated in response to movement of the second piston.

Also, the British Patent Application GB 2170874A discloses a servo-assisted master cylinder assembly for a vehicle hydraulic braking system which has a master cylinder with primary and secondary pistons operative to pressurize primary and secondary pressure spaces for primary and secondary brake circuits. A servo chamber is defined behind the primary piston, and pressurization of the servo chamber from a source of pressure fluid is controlled by valve means which comprises a spool operated solely by pressure in the primary space and a bias force from servo pressure and spring in a bias chamber. In the assembly disclosed in the application, the spool is arranged on a different axis from that of the master cylinder, i.e., in parallel with it, or perpendicularly to it.

According to the assemblies disclosed in the U.S. Patent and British Patent Application as described above, it is so arranged that the pressurized fluid which was regulated by a valve device is supplied to a power chamber (or, servo chamber). And, with respect to the regulating act done by the regulator, the valve device is adapted to control a balance between the regulated pressure and the master cylinder pressure, which are applied to the front and rear of a control piston, respectively. In operation, the hydraulic pressure of the pressurized fluid supplied from the source thereof is rapidly transmitted to the control piston, to make the pressure balance by repetition of increasing and decreasing the pressure of the fluid. Therefore, with the pressurized and regulated fluid supplied to the power chamber (servo chamber), a necessary boosting operation can be made. However, when a brake pedal is operated rapidly under the circumstance of a relatively low temperature for instance, the pressure decreasing operation might be initiated without sufficient amount of brake fluid supplied to the power chamber, so that sufficient boosting operation might not be made. In the case where the diameter of a passage for supplying the fluid to the power chamber is relatively small, or the length of the passage is relatively long, a proper response for boosting the pressure can not be obtained, so that conditions for designing the assembly will be severe.

According to the above-described assemblies, the regulated pressure discharged from the regulator is provided for various hydraulic brake pressure controls such as the antiskid control. However, when the regulated pressure is provided for the hydraulic brake pressure control, the hydraulic pressure in the power chamber will be varied in response to variation of the regulated pressure. Then, the depressing force of the brake pedal will be varied in response to variation of the hydraulic pressure in the power chamber, whereby the brake pedal feeling to the vehicle driver might be deteriorated.

Furthermore, in order to increase the braking force when a rapid braking operation is made in case of emergency for example, Japanese Patent Laid-open Publication No. 9-24818 proposes a vehicle braking control apparatus, which includes a regulator for regulating power pressure discharged from a power source and supplying regulated pressure to wheel brake cylinders during a normal braking operation, and changeover means for communicating the pressure source directly with the wheel brake cylinders in case of an emergency braking operation. That publication discloses the regulator using a spool valve, and discloses means for varying an area for receiving the regulated pressure, so as to provide a desired characteristic of the regulated pressure to the master cylinder pressure. In practice, a resilient member such as rubber is placed ahead of the spool valve through an engaging member, to restrict the pressure applied to the spool valve, in accordance with increase of the area of the resilient member contacting with the engaging member. Also, Japanese Patent Laid-open Publication No. 9-24819 discloses an apparatus provided with an orifice for increasing the braking force in case of the emergency braking operation.

According to the above-described Japanese Patent Laid-open Publication Nos. 9-24818 and 9-24819, it is possible to increase the braking force in case of the emergency braking operation. In a transitional period of that braking operation, however, the braking force to de added may not necessarily be sufficient. Furthermore, when the brake pedal is released, the braking force will not be released immediately thereafter, so that the vehicle driver will be uncomfortable in his braking operation. In order to avoid this, it is necessary to provide a pressure sensor in the hydraulic pressure circuit to detect the release of the brake pedal. However, a relatively large delay occurs until the pressure decreasing operation will be initiated after the release of the brake pedal is detected. In stead of the expensive pressure sensor, it is preferable to employ a stroke sensor for detecting a stroke of the brake pedal. According to the apparatus disclosed in the publications described above, however, it is very difficult to detect the release of the brake pedal. The apparatus disclosed in the U.S. Pat. No. 3,928,970 is not adapted to increase the braking force in case of the emergency braking operation as described in the Japanese publications.

SUMMARY OF THE INVENTION

Accordingly, it is an object of the present invention to provide a hydraulic brake apparatus for a vehicle having a hydraulic pressure boosting device, with a proper boosting operation ensured.

It is another object of the present invention to provide a hydraulic brake apparatus for a vehicle having a hydraulic pressure boosting device, with little variation of hydraulic pressure in a power chamber caused during the boosting operation.

It is a further object of the present invention to provide a hydraulic brake apparatus for a vehicle having a hydraulic pressure boosting device, wherein braking force can be increased immediately when an emergency braking operation is initiated, and the braking force can be released properly and immediately when the braking operation is terminated.

In accomplish the above and other objects, a hydraulic brake apparatus is provided for applying braking force to each wheel of a vehicle in response to depression of a manually operated braking member. The apparatus includes a cylinder body mounted on the vehicle, a reservoir for storing brake fluid, a master cylinder having a master piston slidably received in the cylinder body to define a pressure chamber ahead of the master piston and a power chamber behind the master piston, so that the brake fluid in the reservoir is fed into the pressure chamber, and the master piston is moved in response to operation of the manually operated braking member to discharge hydraulic brake pressure from the pressure chamber. An auxiliary pressure source is provided for pressurizing the brake fluid in the reservoir to discharge power pressure of a predetermined value. A control piston is slidably disposed in the cylinder body ahead of the master piston to be movable in response to movement of the master piston, so that the control piston defines ahead thereof a regulator chamber, and exposes a rear end thereof to the pressure chamber. A first passage is adapted to communicate the auxiliary pressure source with the power chamber, and a second passage is adapted to communicate the power chamber with the reservoir through the regulator chamber. A pressure increase valve device is disposed in the first passage to open or close the first passage in response to movement of the control piston. And, a pressure decrease valve device is disposed in the second passage to open or close the second passage in response to movement of the control piston.

Preferably, a one way valve device is provided for allowing the brake fluid to flow from the pressure increase valve device to the power chamber and preventing the reverse flow. Furthermore, a modulator may be connected with one end of the one way valve device to be connected with the pressure increase valve device, to supply the hydraulic brake pressure discharged from the pressure increase valve device into wheel brake cylinders of the vehicle in accordance with the driving conditions of the vehicle. The one way valve device may be formed by a check valve which is disposed in the first passage at a portion thereof opening to the power chamber.

A pressure restriction device may be provided for restricting the hydraulic brake pressure fed from the power chamber into the regulator chamber in response to operation of the manually operated braking member.

The pressure restriction device may include a valve device which is disposed in the second passage to normal open the second passage, and close the second passage when the manually operated braking member is operated rapidly, and a pressure decreasing device which is disposed in parallel with the valve device to decrease the hydraulic brake pressure fed into the regulator chamber in accordance with a predetermined characteristic. The valve device may include a rapid operation detecting device for detecting operation of the manually operated braking member to output a cut-off signal when the manually operated braking member is operated at a speed greater than a predetermined speed, and a normally open electromagnetic valve for closing the second passage when the rapid operation detecting device outputs the cut-off signal.

A pressure control device may be disposed between the power chamber and the regulator chamber to control the pressure transmitted from the power chamber in the second passage to the regulator chamber on the basis of a predetermined characteristic.

Preferably, the master piston, control piston, pressure decrease valve device and pressure increase valve device are aligned along a common axis in the cylinder body, to define the regulator chamber between the pressure decrease valve device and the control piston.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
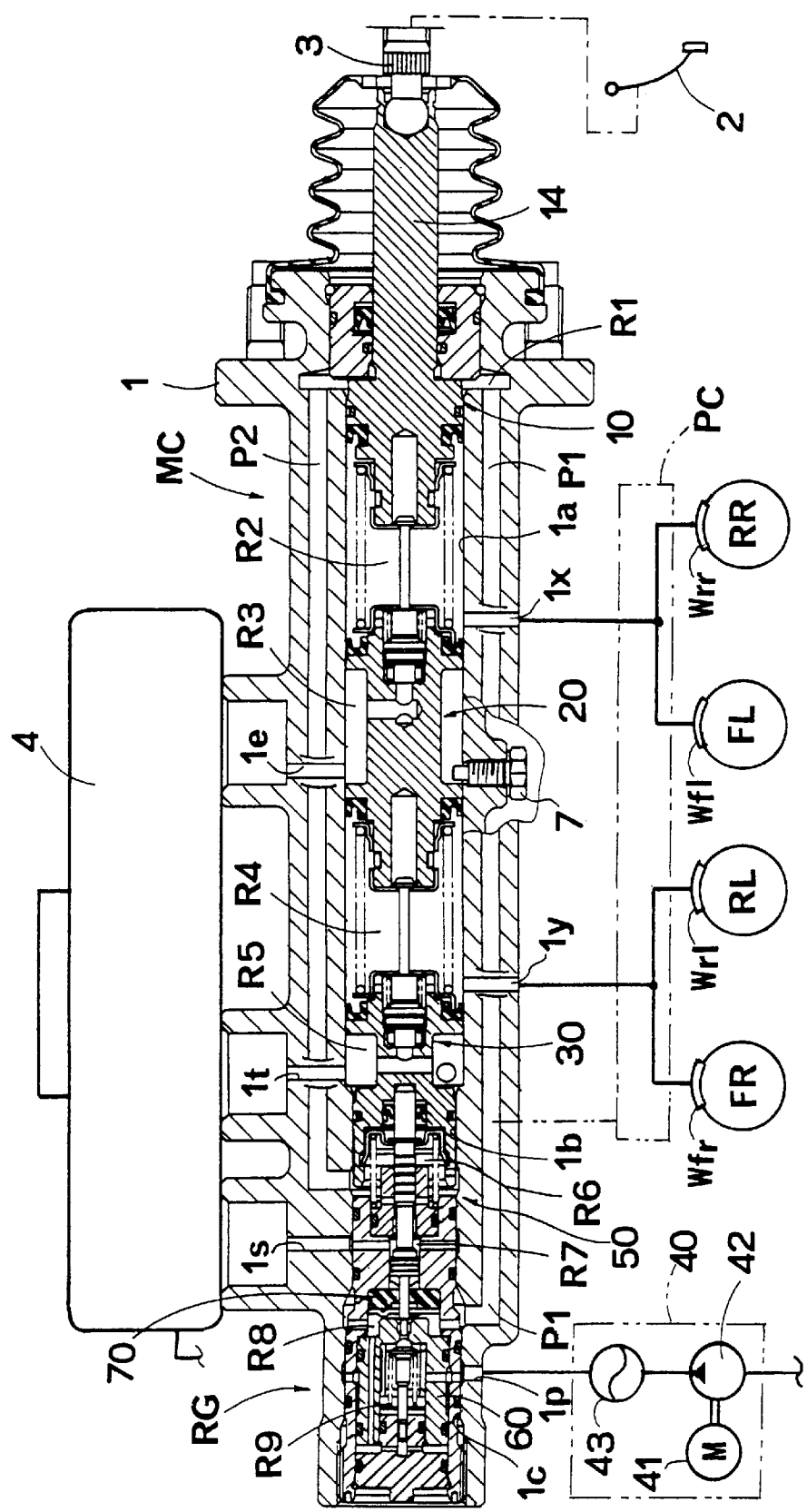
FIG. 1 is a sectional view of a hydraulic brake apparatus according to an embodiment of the present invention.

Referring to FIG. 1, there is illustrated a hydraulic brake apparatus for a vehicle according to an embodiment of the present invention, which includes a cylinder body 1 provided with a master cylinder MC and a regulator RG. The master cylinder MC has a couple of pressure chambers R2, R4 to form a tandem-type master cylinder connected to a diagonal circuit. A brake pedal 2 is disposed behind the cylinder body 1, i.e., at the right side in FIG. 1, and served as the manually operated braking member according to the present invention. When a depressing force is applied to the brake pedal 2 the force is transmitted as a braking force to the master cylinder MC and the regulator RG through a push rod 3. In response to the depressing force, a hydraulic brake pressure is generated from the two pressure chambers R2, R4, and applied to wheel brake cylinders Wfr, Wrl which are operatively mounted on a front right wheel FR and a rear left wheel RL, and wheel brake cylinders Wfl, Wrr which are operatively mounted on a front left wheel FL and a rear right wheel RR, respectively. The regulator RG discharges regulated pressure in response to depression of the brake pedal 2, to assist movement of the master cylinder MC in response to operation of the regulator RG, as described later.

In the cylinder body 1, there is formed a stepped bore which includes bores 1a, 1b, 1c having different inner diameters from one another, and in which master pistons 10, 20, and a control piston 30 are received to define the pressure chamber R2 between the master pistons 10 and 20, and define the pressure chamber R4 between the master piston 20 and the control piston 30. The rear end of the bore 1a is communicated with a power chamber R1 having an inner diameter larger than that of the bore 1a. Opposite end portions of the control piston 30 are fluid-tightly and slidably received in the bore 1b of the smallest inner diameter and the bore 1a, respectively.

Figure 2:
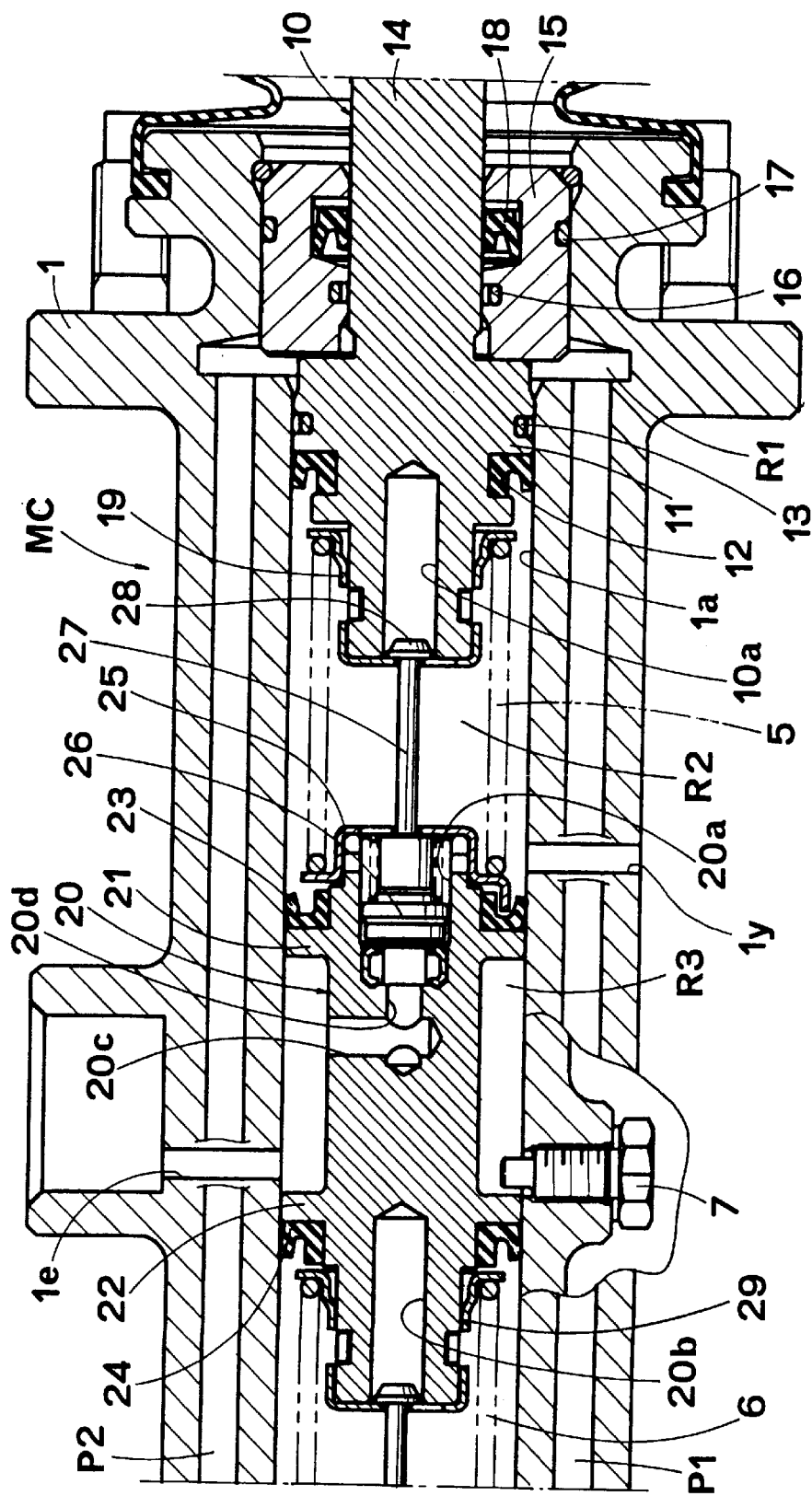
FIG. 2 is an enlarged sectional view of a master cylinder in the hydraulic brake apparatus of the above embodiment.

The master piston 10 has a land portion 11 formed around an outer surface of its front end portion, as shown in FIG. 2. The land portion 11 retains an annular cup-like seal member 12 and an annular seal member 13 to be fluid-tightly and slidably received in the bore 1a, with the front end surface of the seal member 12 facing the rear end surface of the master cylinder 20. Therefore, the power chamber R1 and the pressure chamber R2 are separated by the seal members 12, 13. A main body 14 of the master piston 10 is supported by a cylindrical sleeve 15, the inner surface and outer surface of which are formed with annular grooves, and also an annular groove on the inner surface which is axially remote from them by a certain distance. Annular seal members 16, 17 and an annular cup-like seal member 18 are received in those grooves to ensure a sealing property against the power chamber R1. The front end portion of the master piston 10 is formed with a recess 10a which extends axially from its tip end surface, and a retainer 19 is mounted on it.

The master piston 20 has a land portion 21 formed around an outer surface of its rear end portion, and a land portion 22 of the same outer diameter as that of the land portion 21, which is formed around an outer surface of its front end portion away from the land portion 21 by a certain distance. These land portions 21, 22 retain annular cup-like seal members 23, 24 to be fluid-tightly and slidably received in the bore 1a. The opposite end portions of the master piston 20 are formed with recesses 20a, 20b which extend axially from its tip end surfaces, and a radial recess 20c which is communicated with the recess 20a through an axial passage 20d. Between the land portions 21 and 22, there is defined an annular fluid chamber R3, which is communicated with a reservoir 4 through a port 1e, and which can be communicated with the pressure chamber R2 through the recess 20c, passage 20d and recess 20a. And, a retainer 29 is mounted on the front end portion of the master piston 20.

A retainer 25 is mounted on a rear end portion of the master piston 20 to prevent a valve member 26 from moving beyond the retainer 25 toward the master piston 10. The tip end of the valve member 26 is covered by a member made of resilient material such as rubber, which can abut on an opening end of the passage 20d to shut off the same. At the other end of the valve member 26, a rod 27 is formed to be integral with the valve member 26. And, the rod 27 is provided at its rear end with an engaging portion 28, which is slidably received in the recess 10a, and which can be engaged with the retainer 19 to prevent the engaging portion 28 from moving beyond the retainer 19 toward the master piston 20. A spring 5 is mounted between the retainer 19 of the master piston 10 and the retainer 25 of the master piston 20 to urge them away from each other. The rear end position of the master piston 20 is set by an engaging pin 7 screwed into the cylinder body 1.

Figure 3:
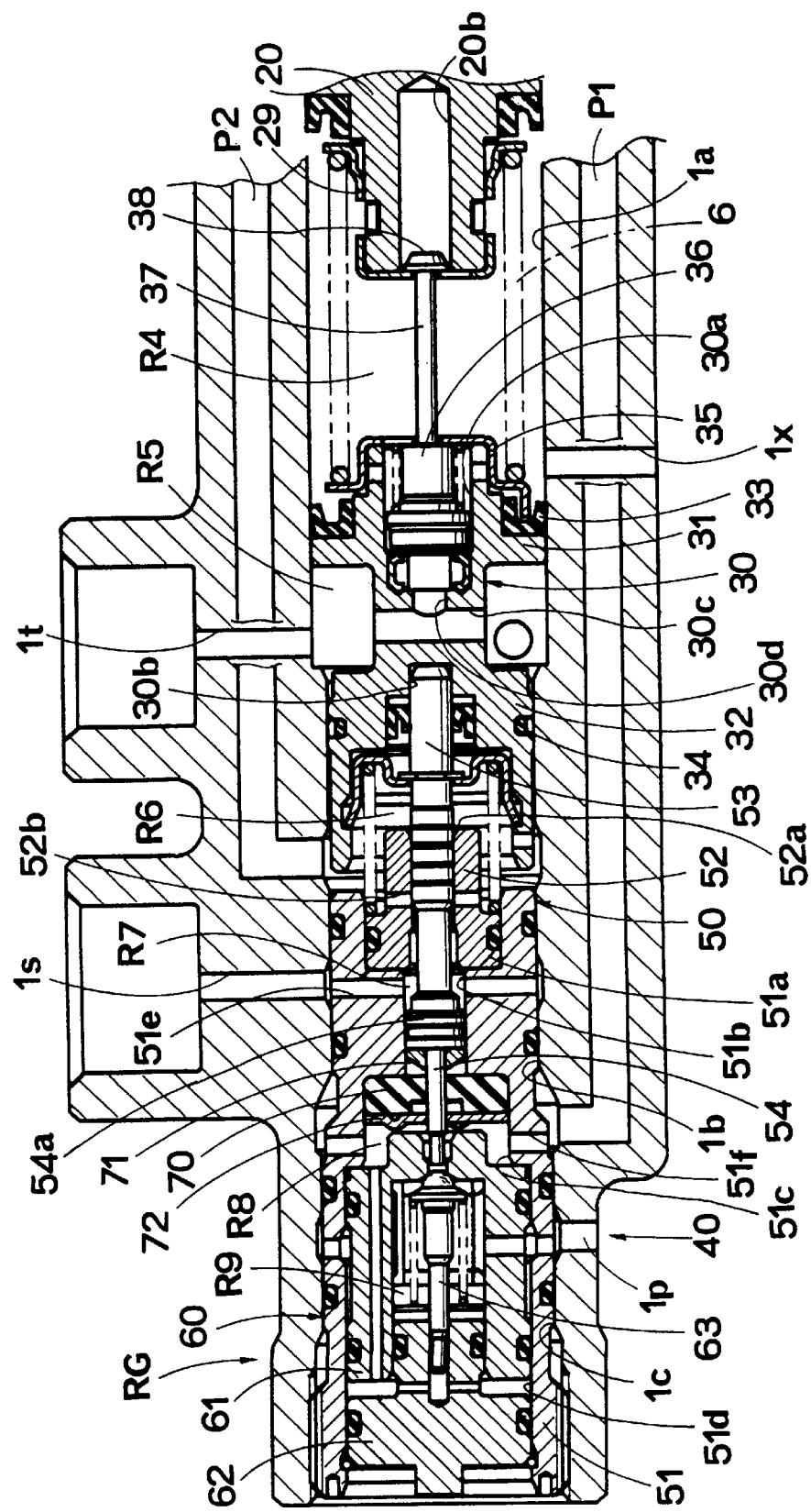
FIG. 3 is an enlarged sectional view of a regulator in the hydraulic brake apparatus of the above embodiment.

As shown in FIG. 3, the control piston 30 has a relatively large diameter land portion 31 formed around an outer surface of its rear end portion, and a relatively small diameter land portion 32 formed around an outer surface of a portion axially away from the land portion 31 by a certain distance. The land portion 31 retains an annular cup-like seal member 33, and the land portion 32 retains a seal member 34, so that the land portion 31 is fluid-tightly and slidably received in the bore 1a, while the land portion 32 is fluid-tightly and slidably received in the bore 1b. Therefore, the pressure chamber R4 and the fluid chamber R5 are separated by the seal members 33, while the fluid chamber R5 and a regulator chamber R6, which will be described later, are separated by the seal member 34. That is, the fluid chamber R5 is defined between the seal members 33 and 34, and communicated with the reservoir 4 through a port it. The opposite end portions of the control piston 30 are formed with a recess 30a and a stepped recess 30b which extend axially from its tip end surfaces, and a radial passage 30c which is communicated with the recess 30a through a passage 30d. A retainer 35 is mounted on a rear end portion of the control piston 30, and it can be engaged with the valve member 36 as constructed in the same manner as the valve member 26 to prevent the valve member 36 from moving beyond the retainer 35 toward the master piston 10. At the other end of the valve member 36, a rod 37 is formed to be integral with the valve member 36. And, the rod 37 is provided at its rear end with an engaging portion 38, which is slidably received in the recess 20b, and which can be engaged with the retainer 29 to prevent the engaging portion 38 from moving beyond the retainer 29 toward the control piston 30. A spool 53 which will be described later is held at its rear end portion within the stepped recess 30b at the bottom portion thereof. A spring 6 is mounted between the retainer 29 of the master piston 20 and the retainer 35 of the control piston 30 to urge them away from each other.

Referring back to FIG. 1, ahead of the cylinder body 1, the regulator RG is formed, and connected to an auxiliary pressure source 40 for discharging the power pressure. The regulator RG is adapted to regulate the power pressure to produce a regulated pressure to be supplied to a pressure control valve device, or a modulator PC as indicated by a two-dotted chain line in FIG. 1. The modulator PC includes electromagnetic valves, i.e., solenoid valves connected to a controller (not shown), and is adapted to control the regulated pressure supplied to the wheel brake cylinders Wfr and etc. in accordance with driving conditions of the vehicle. The auxiliary pressure source 40 includes a hydraulic pressure pump 42 and an accumulator 43. The pump 42 is driven by an electric motor 41 to pressurize brake fluid in the reservoir 4 to discharge the pressurized brake fluid, or power pressure through a port 1p into the regulator RG.

As shown in FIG. 3, the regulator RG includes a cylindrical sleeve 51 which is received in the stepped bore 1c communicating with the bore 1b. The sleeve 51 has a plurality of circumferential grooves formed around its periphery, and annular seal members are fitted into the grooves, respectively. Radial passages 51e, 51f are formed between the neighboring seal members to communicate the hollow portion of the sleeve 51 with a port 1s and a first passage P1, respectively. A regulator chamber R6 is defined between the rear end surface of the sleeve 51 and the front end surface of the control piston 30, and communicated with the power chamber R1 as shown in FIGS. 1 and 2 through the passage P2. The hollow portion of the sleeve 51 is formed into a stepped bore having bores 51a, 51b, 51c, 51d. The inside of the bore 51b of the smallest diameter forms a drain chamber R7 which is communicated with the reservoir 4 through the passage 51e and port 1s. Received in the bore 51a is a sleeve 52 in which a stepped bore 52a is formed and a radial passage 52b is formed perpendicularly to the stepped bore 52a to communicate with the regulator chamber R6. A spool 53 is slidably received in the stepped bore 52a of the sleeve 52. A plunger 54 is received in the bore 51b with its base end portion 54a slidably received in the bore 51b, and with the rear end surface of the portion 54a arranged in abutment with the tip end surface of the spool 53 of the spool valve mechanism 50.

A resilient member 70, which is formed into a columnar shape by rubber for example, is disposed in the bore 51c. The plunger 54 extends through the resilient member 70 with its tip end placed within a poppet valve mechanism 60. An annular transmitting member 71 is disposed between the base end portion 54a of plunger 54 and the resilient member 70, which is formed with a recess on a surface opposite to the surface in abutment with the transmitting member 71. A plate 72 is disposed in abutment with the front end surface of the resilient member 70 to apply the hydraulic pressure equally to the whole surface of the resilient member 70. Within the bore 51c, a power output chamber R8 is defined between the resilient member 70 and the poppet valve mechanism 60. The power output chamber R8 is communicated with the passage P1 through the passage 51f of the sleeve 51. As shown in FIG. 1, the passage P1 is communicated with the power chamber R1, which is communicated with the regulator chamber R6 through a second passage P2.

In other words, a space for regulating the hydraulic pressure is formed by the power output chamber R8, passage P1, power chamber R1, passage P2 and regulator chamber R6.

Figure 4:
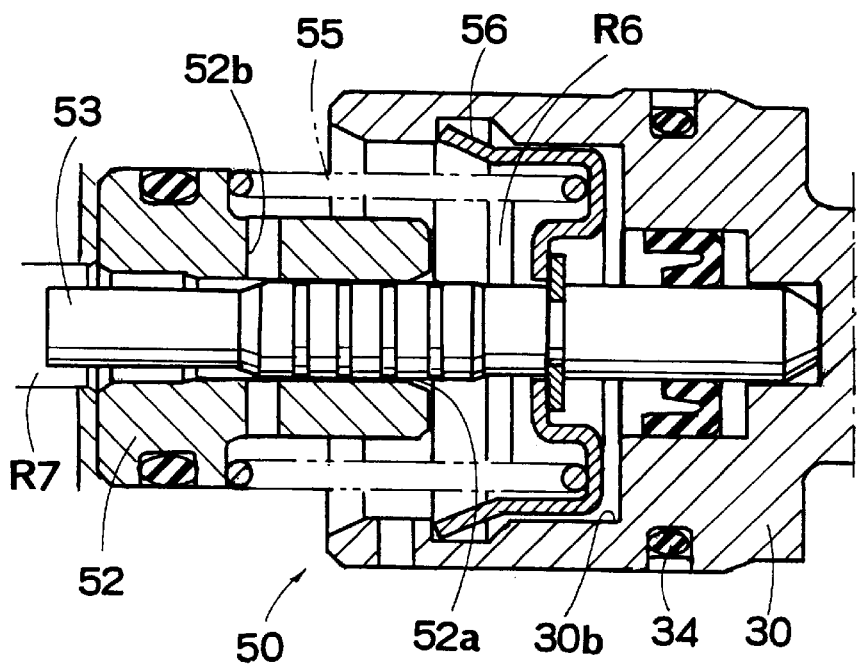
FIG. 4 is an enlarged sectional view of a spool valve mechanism in the hydraulic brake apparatus of the above embodiment.

Next will be described the spool valve mechanism 50, which serves as the pressure decrease valve means according to the present invention. As shown in FIG. 4, the mechanism 50 includes a spool 53 which is formed into a stepped columnar shape with a plurality of labyrinth grooves formed on its large diameter portion. In the middle portion of the spool 53 is mounted a retainer 56, which is accommodated in the stepped recess 30b to be supported by the control piston 30. A spring 55 is mounted between the retainer 56 and the control piston 30 to urge the spool 53 to contact with the bottom surface of the stepped recess 30b. At a portion of the sleeve 52 into which the spool 53 is fitted, the passage 52b is always communicated with the regulator chamber R6, and adapted to be communicated with the drain chamber R7 at the initial position of the spool 53. It is so arranged that area of space between the sleeve 52 and the spool 53 is restricted by the large diameter portion of the spool 53 in accordance with the forward movement of the spool 53, and finally the passage 52b is closed. As shown in FIG. 3, the drain chamber R7 is communicated with the reservoir 4 (in FIG. 1) through the passage 51e of the sleeve 51 and the port is of the cylinder body 1. Therefore, when the spool 53 is placed in its initial position, the regulator chamber R6 is communicated with the reservoir 4 to be filled with the brake fluid under atmospheric pressure. As for the pressure decrease valve means, any devices other than the spool valve mechanism 50 may be employed. And, they may not necessarily be placed within the regulator RG, but may be placed near the power chamber R1, for example.

Figure 5:
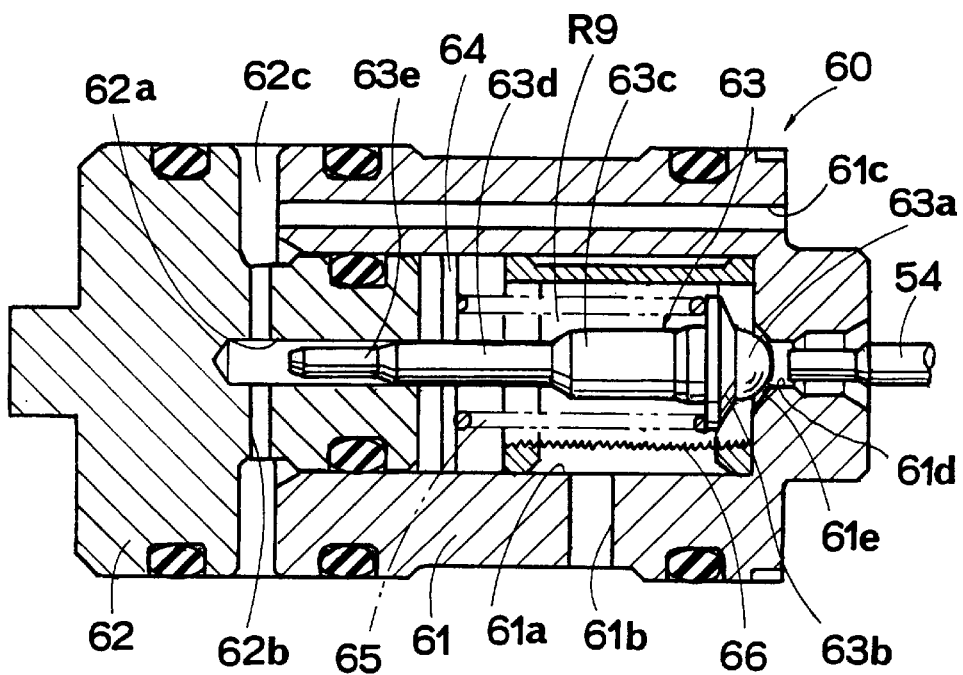
FIG. 5 is an enlarged sectional view of a poppet valve mechanism in the hydraulic brake apparatus of the above embodiment.

As shown in FIG. 5, the poppet valve mechanism 60, which serves as the pressure increase valve means according to the present invention, includes a sleeve 61 which is formed into a cylinder with a bottom. The sleeve 61 has a longitudinal hollow portion 61a defined therein, a radial passage 61b defined to be communicated therewith, and a passage 61c defined in parallel with the passage 61a to penetrate the sleeve 61. At the center of the bottom of sleeve 61, an axial passage 61d is defined to form a valve seat 61e opening to the hollow portion 61a. On the outer peripheral surface of the sleeve 61, a plurality of annular grooves are formed to receive therein annular seal members. Between the neighboring seal members, there is defined a radial passage 61b, through which the hollow portion 61a is communicated with a port 1p as shown in FIGS. 1 and 3. In the hollow portion 61a of the sleeve 61, are disposed a valve member 63, retainer 64, spring 65 and filter 66. By fitting a small diameter portion of stepped columnar sleeve 62 into the hollow portion 61a, a power input chamber R9 is defined in the hollow portion 61a of the sleeve 61. The power input chamber R9 can be communicated with the power output chamber R8 (in FIG. 3) through the passage 61d. The sleeve 62 has an axial passage 62a defined therein, and a radial passage 62b defined perpendicularly to the passage 62a. The valve member 63 has a valve portion 63a at its tip end, followed by a collar portion 63b and a stepped columnar body having a large diameter portion 63c, intermediate diameter portion 63d and small diameter portion 63e. The intermediate diameter portion 63d is slidably received in the axial passage 62a, of the sleeve 62. The opening area of the axial passage 62a, is set to be substantially the same as the area of the valve portion 63a to be seated on the valve seat 61e. The valve member 63 is received in the hollow portion 61a of the sleeve 61 together with the filter 66. A spring 65 is mounted between the retainer 64 and the collar portion 63b of the valve member 63 to urge the valve portion 63a to be seated on the valve seat 61e. The small diameter portion of the sleeve 62 is fitted into the hollow portion 61a of the sleeve 61 so as to support the intermediate portion 63d of the valve member 63 in the axial passage 62a. As a result, a space 62c is formed between the front end surface of the sleeve 61 and the rear end surface of the sleeve 62, so that the axial passage 62a is communicated with power output chamber R8, i.e., a space facing the tip end of the valve portion 63a to be seated on the valve seat 61e, through the passage 62b, space 62c and passage 61c of the sleeve 61. Therefore, substantially the same pressure is applied to the opposite ends of the valve member 63 in the axial direction thereof, so that a load applied to the valve member 63 will be very small. Furthermore, a plunger 54 is arranged to face the valve portion 63a of the valve member 63, with a small space formed between the valve portion 63a and the tip end of the plunger 54 in its initial position as shown in FIG. 5.

Figure 6:
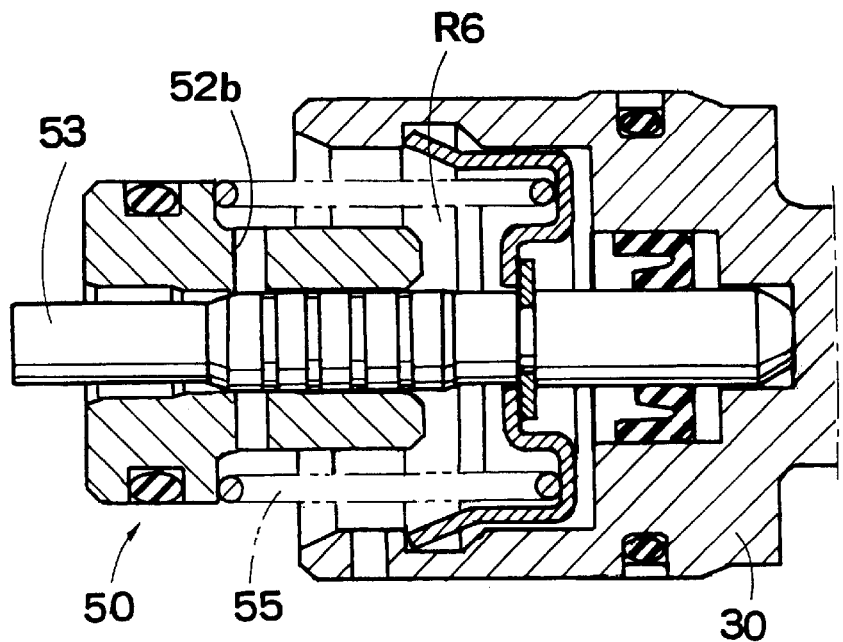
FIG. 6 is an enlarged sectional view of the spool valve mechanism in motion according to the above embodiment.
Figure 7:
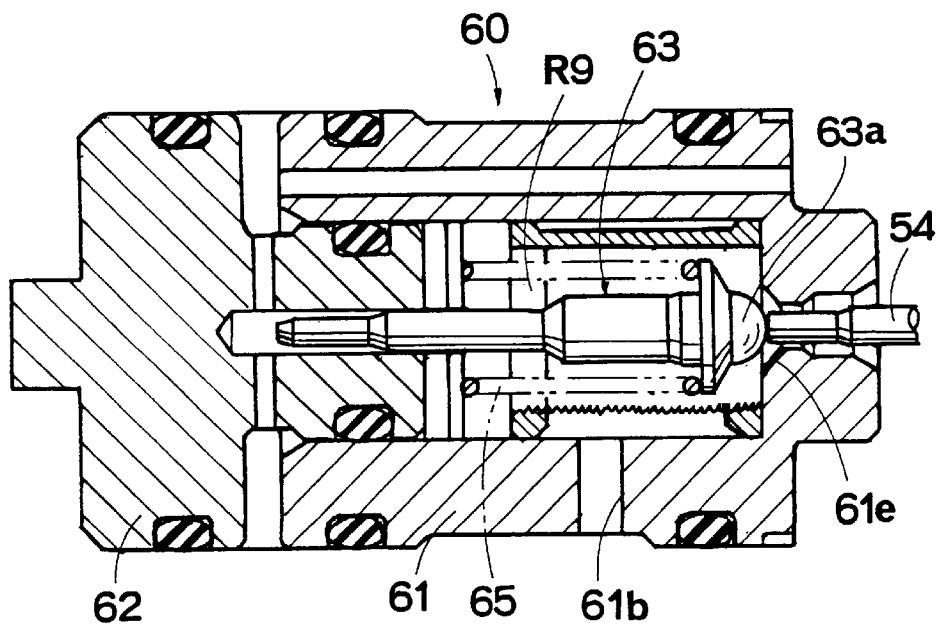
FIG. 7 is an enlarged sectional view of the poppet valve mechanism in motion according to the above embodiment.

In the initial position as shown in FIGS. 1 and 3, therefore, the regulator chamber R6 is communicated with the reservoir 4 through the passages 52a, 52b of the sleeve 52, the passage 51e of the sleeve 51 and the port is, so that the inside of the regulator chamber R6 is under atmospheric pressure. When the control piston 30 is moved forward to move the spool 53 forward, the passage 52b of the sleeve 52 is closed by the outer surface of the spool 53 as shown in FIG. 6, and in turn, the valve member 63 of the poppet valve mechanism 60 is opened as shown in FIG. 7. Consequently, the power pressure is supplied from the auxiliary pressure source 40 to the power chamber R1 through the passage P1, then fed to the regulator chamber R6 through the passage P2 to increase the pressure in each chamber. When a force applied to the front land portion 32 of the control piston 30 by the regulated pressure exceeds a force applied to the rear land portion 31 by the master cylinder pressure, the control piston 30 is moved rearward to close the valve member 63 of the poppet valve mechanism 60 and open the spool 53 of the spool valve mechanism 50, the pressure in the regulator chamber R6 (and power chamber R1, power output chamber R8 and passages P1, P2) is reduced. With the above-described operation repeatedly performed, the pressure in the chamber is regulated to provide the predetermined regulated pressure.

Next will be explained overall operation of the hydraulic brake pressure apparatus as constituted above. FIGS. 1–3 show a state of the apparatus in the case where the brake pedal 2 is not depressed. If the brake pedal 2 is depressed to push the master piston 10 forward (leftward in FIG. 1) through the push rod 3, the valve member 26 abuts on the master piston 20 to close the passage 20d by the resilient member of the valve member 26, so that the communication between the pressure chamber R2 and the fluid chamber R3 is cut off to provide a closed state. At the same time, the valve member 36 abuts on the control piston 30 to close the passage 30d by the resilient member of the valve member 36, so that the communication between the pressure chamber R4 and the fluid chamber R5 is cut off to provide a closed state. Provided that the communication between the a pressure chamber R2 and the fluid chamber R3 is cut off, and that the communication between the pressure chamber R4 and the fluid chamber R5 is cut off, if the master piston 10 is moved in response to depression of the brake pedal 2, the master pistons 10, 20 and the control piston 30 are held as shown in FIGS. 2 and 3, with the master pistons 10 and 20 connected by the spring 5, and with the master piston 20 and control piston 30 connected by the spring 6, so that they move together in a body. As a result, the passage 52b is closed by the spool 53, which is supported in the control piston 30, to cut off the communication with the reservoir 4. At the same time, the power pressure is supplied from the auxiliary pressure source 40 to the power chamber R1 through the passage P1. Then, the master pistons 10, 20 move forward to compress further the pressure chambers R2, R4, and discharge the hydraulic brake pressure, i.e., master cylinder pressure from ports 1x, 1y. In this case, since a sealing diameter of the land portion 31 of the control piston 30 is larger than the sealing diameter of the land portion 32, the hydraulic brake pressure of a value greater than the master cylinder pressure, i.e., regulated pressure is generated in accordance with the movement of the control piston 30. Therefore, the master piston 10 is assisted to move forward by the power pressure, which is supplied from the power output chamber R8 into the power chamber R1 through the passage P1 in response to depression of the brake pedal 2, i.e., the regulated pressure.

During the operation as described above, when the force applied to the control piston 30 by the regulated pressure in the regulator chamber R6 exceeds the force applied to the control piston 30 by the master cylinder pressure in the pressure chambers R2, R4, the control piston 30 is moved in such a direction as to open the spool 53 of the spool valve mechanism 50 and close the valve member 63 of the poppet valve mechanism 60, so that the pressure in the regulator chamber R6 is reduced. When the relationship between the forces applied to the control piston 30 is reversed, the control piston 30 is moved in such a direction as to close the spool 53 of the spool valve mechanism 50 and open the valve member 63 of the poppet valve mechanism 60, so that the pressure in the regulator chamber R6 is increased. With the above-described movement of the control piston 30 and the opening or closing operation of the spool valve mechanism 50 and the poppet valve mechanism 60 in response to the movement of the control piston 30 repeatedly performed, the regulated pressure in the chamber is regulated to be greater than the master cylinder pressure by a predetermined value.

In practice, it is so controlled that the force applied to the control piston 30 by the regulated pressure applied to the area of the small diameter land portion 32 for receiving the pressure, and the force applied to the control piston 30 by the master cylinder pressure applied to the area of the large diameter land portion 31 for receiving the pressure will be equal. Accordingly, the regulated pressure, which is greater than the master cylinder pressure by the predetermined value and substantially proportional to the master cylinder pressure, is discharged to provide a first brake pressure characteristic between the brake pedal input and the master cylinder pressure. In the normal braking operation, the hydraulic brake pressure in the power output chamber R8 is transmitted to the resilient member 70 to deform the same, so that the resilient member 70 abuts on the transmitting member 71 to press the valve member 63 to be seated on the valve seat 61e, and press the spool 53 to increase the opening area of the passage 52b. Accordingly, the regulated pressure is reduced to provide a second brake pressure characteristic, which has a smaller increasing rate than that of the first brake pressure characteristic, i.e., gentle increasing gradient, between the brake pedal input and the master cylinder pressure.

Figure 8:
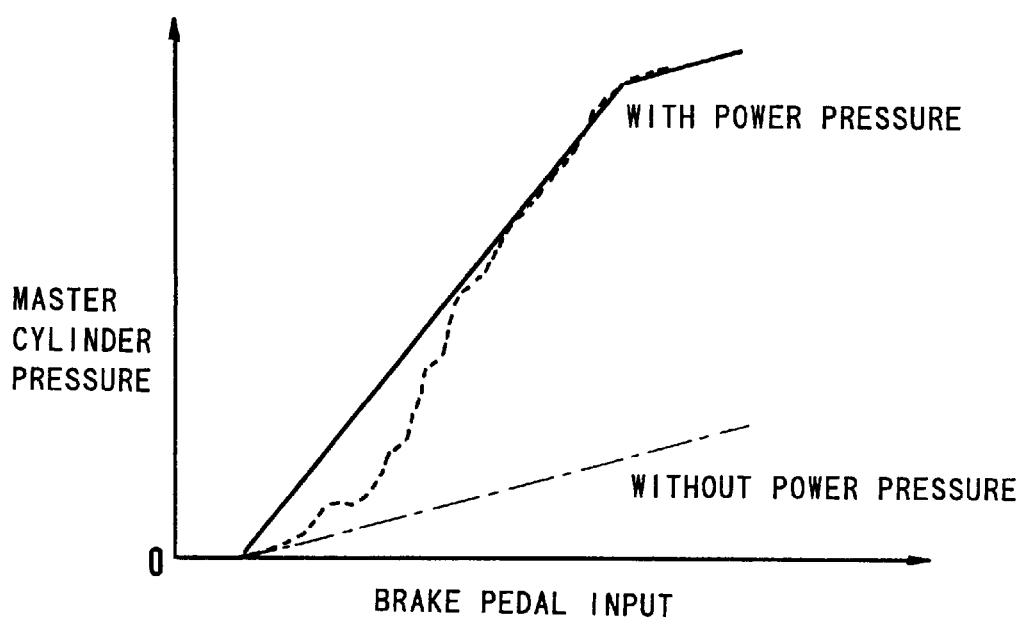
FIG. 8 is a diagram showing a hydraulic brake pressure characteristic for the hydraulic brake apparatus of the above embodiment.

According to the present embodiment, therefore, the boosting operation is performed appropriately with a proper characteristic as indicated by a solid line in FIG. 8, even in case of the rapid depression of the brake pedal 2. Consequently, the desired braking characteristic combined with the first brake pressure characteristic and second brake pressure characteristic (right side of a bent in FIG. 8) will be obtained. As indicated by a broken line in FIG. 8, the brake pressure characteristic according to the prior art is unstable in case of the rapid depression of the brake pedal 2. In the case where the modulator PC is provided, the regulated pressure is controlled in response to the driving conditions of the vehicle to supply the pressure into the wheel brake cylinders, so as to perform a desired control. Furthermore, the brake fluid fed from the pressure passage P1 to the power chamber R1 is returned to the regulator chamber R6 through the passage P2, according to the present embodiment. Therefore, it is easy to fulfill the brake fluid in the whole brake system with no air remained in the power chamber R1.

Figure 9:
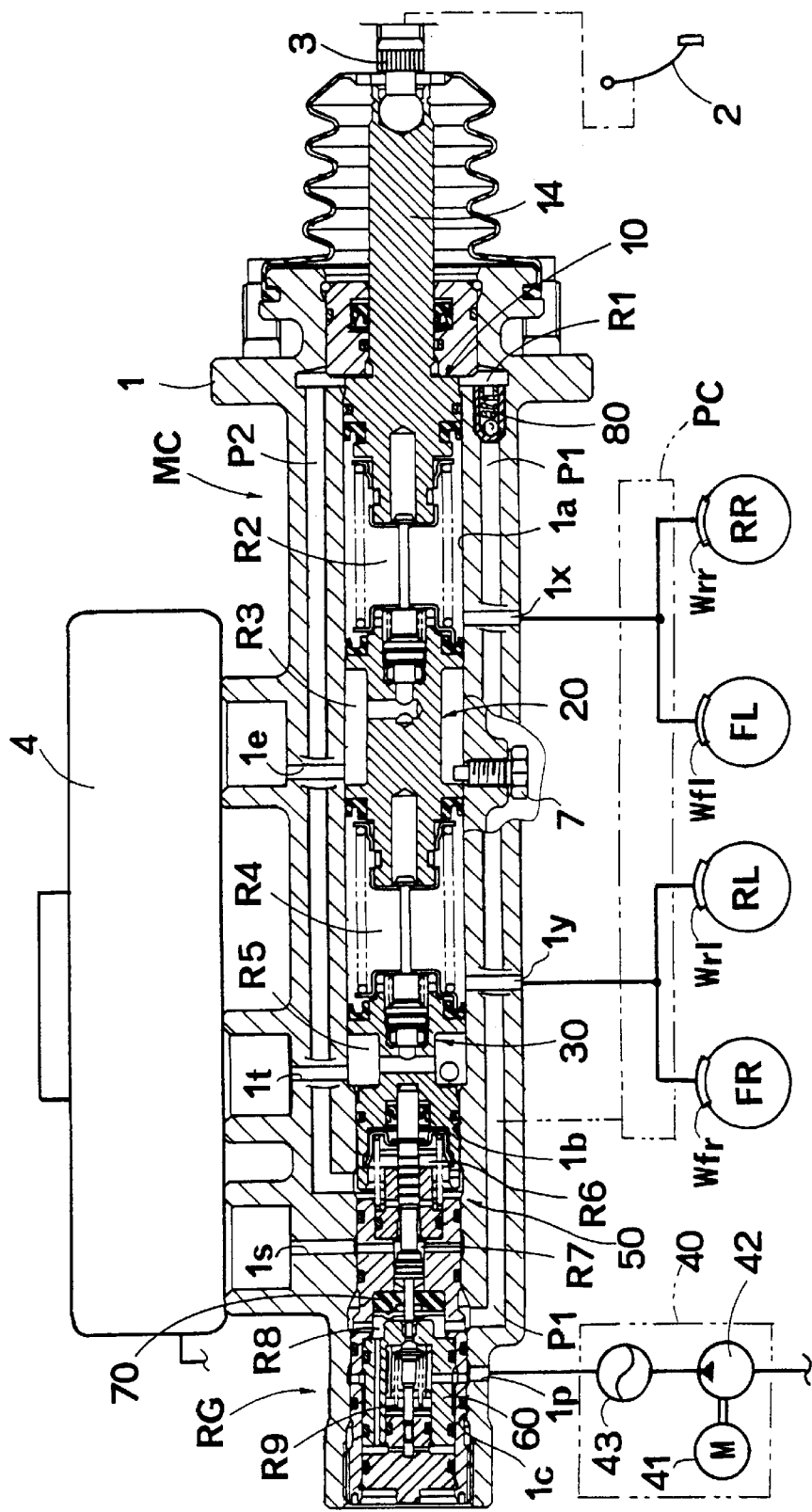
FIG. 9 is a sectional view of a hydraulic brake apparatus according to another embodiment of the present invention.
Figure 10:
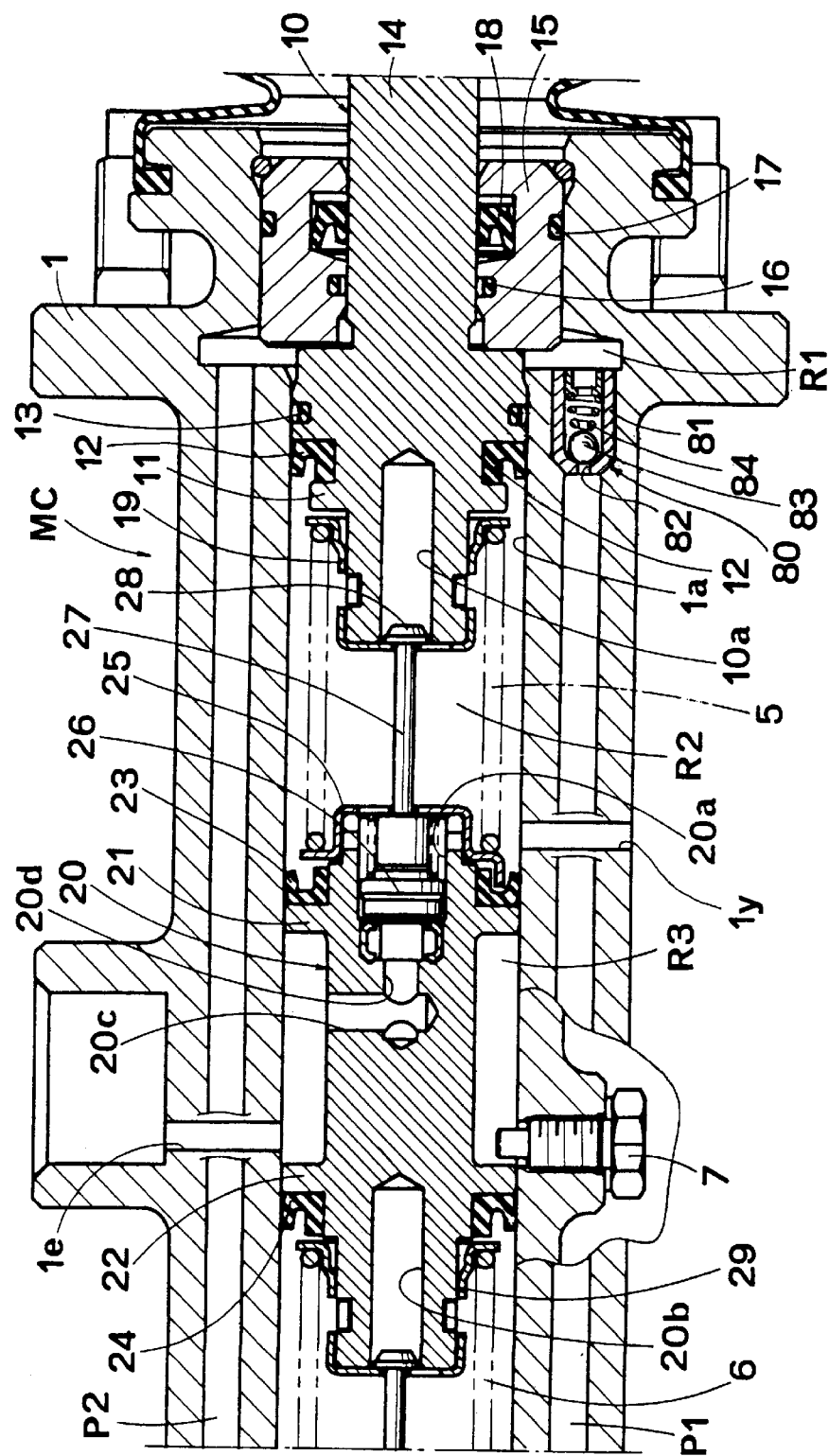
FIG. 10 is an enlarged sectional view of a master cylinder in the hydraulic brake apparatus of another embodiment of the present invention.

FIGS. 9 and 10 show another embodiment of the present invention, wherein a check valve 80, which serves as the one way valve means according to the present invention, is disposed in the passage P1 at a portion thereof connected to the power chamber R1. The check valve 80 includes a cylindrical case 81 with a bottom on which a valve seat 82 is formed, a ball valve 83 which is accommodated in the case 81, and a spring 84 which urges the ball valve 83 to be seated on the valve seat 82. Instead of the check valve 80, any valves may be used for the one way valve means. The modulator PC is connected to the passage P1 between the power output chamber R8 and the check valve 80. At the downstream of the check valve 80, a pressure sensor (not shown) is provided for use in controlling the hydraulic pressure by the modulator PC. The remaining structure of the present embodiment is substantially the same as the embodiment as described before, so that its explanation will be omitted.

According to the hydraulic pressure control apparatus of the embodiment as shown in FIGS. 9 and 10, the regulated pressure is controlled by the modulator PC in accordance with the vehicle conditions, and fed into the wheel brake cylinders Wfr and etc. to perform a desired pressure control. For example, when the hydraulic brake pressure control such as the anti-skid control is performed, the solenoid valves (not shown) in the modulator PC are controlled in accordance with the braking conditions, so that the regulated pressure fed into the wheel brake cylinders Wfr and etc. is controlled to prevent the wheel FR and etc. from being locked. In this case, the brake fluid is allowed to be fed from the poppet valve mechanism 60 to the power chamber R1, and its reverse flow is prevented. Therefore, even if the brake fluid is compensated during the control by the modulator PC to provide suddenly a pressure decreasing state, the pressure in the power chamber R1 will be held by means of the check valve 80. Consequently, the variation of pressure in the power chamber R1 can be reduced to obtain an appropriate feeling in braking operation without causing the vibration of the brake pedal 2.

In the case where the pressure sensor (not shown) is disposed downstream of the check valve 80 for monitoring the depressed condition of the brake pedal 2 according to the embodiment as shown in FIGS. 9 and 10, an output signal of the pressure sensor will be of little noise, so that the control will be made accurately.

Figure 11:
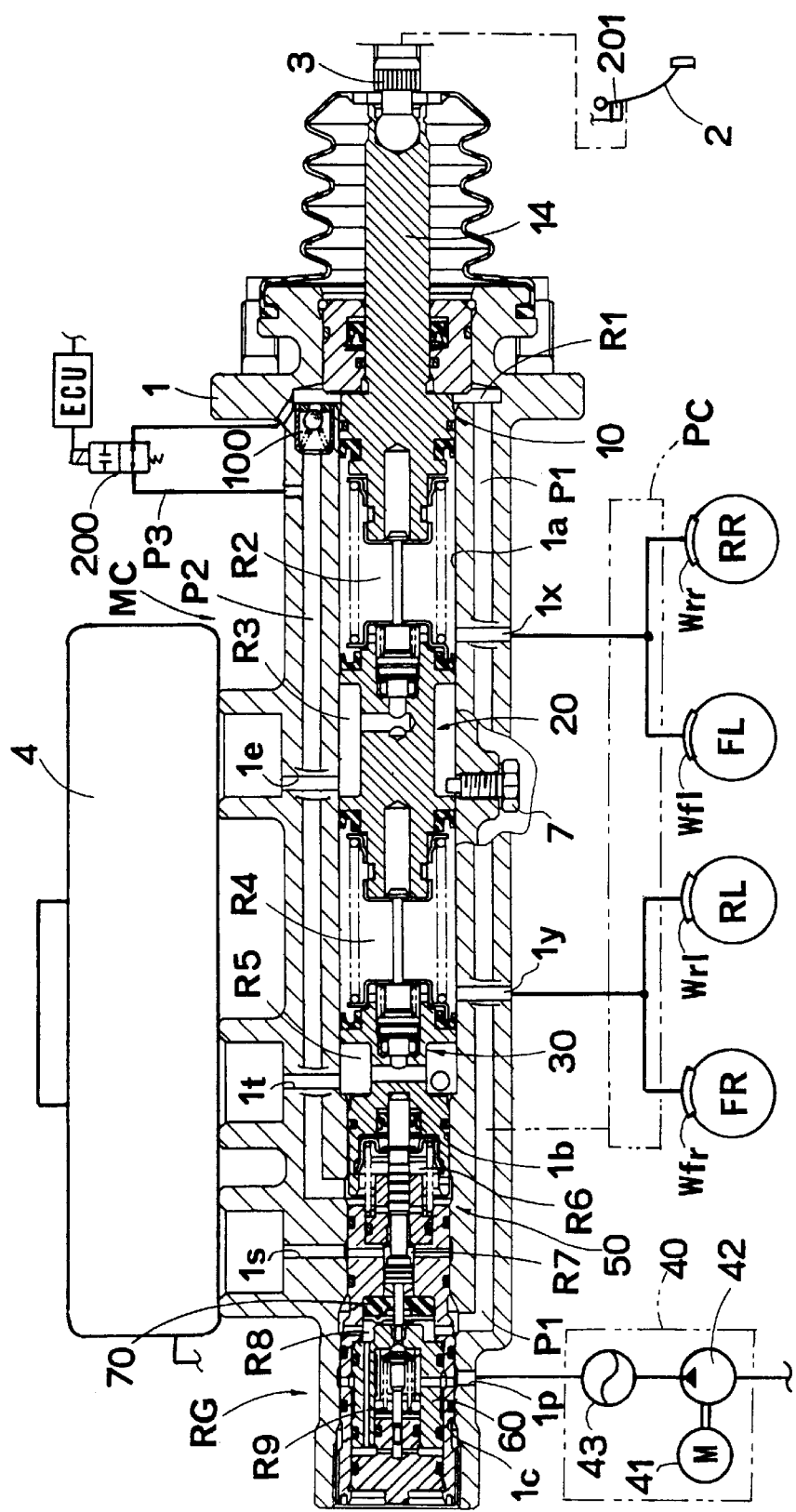
FIG. 11 is a sectional view of a hydraulic brake apparatus according to a further embodiment of the present invention.
Figure 12:
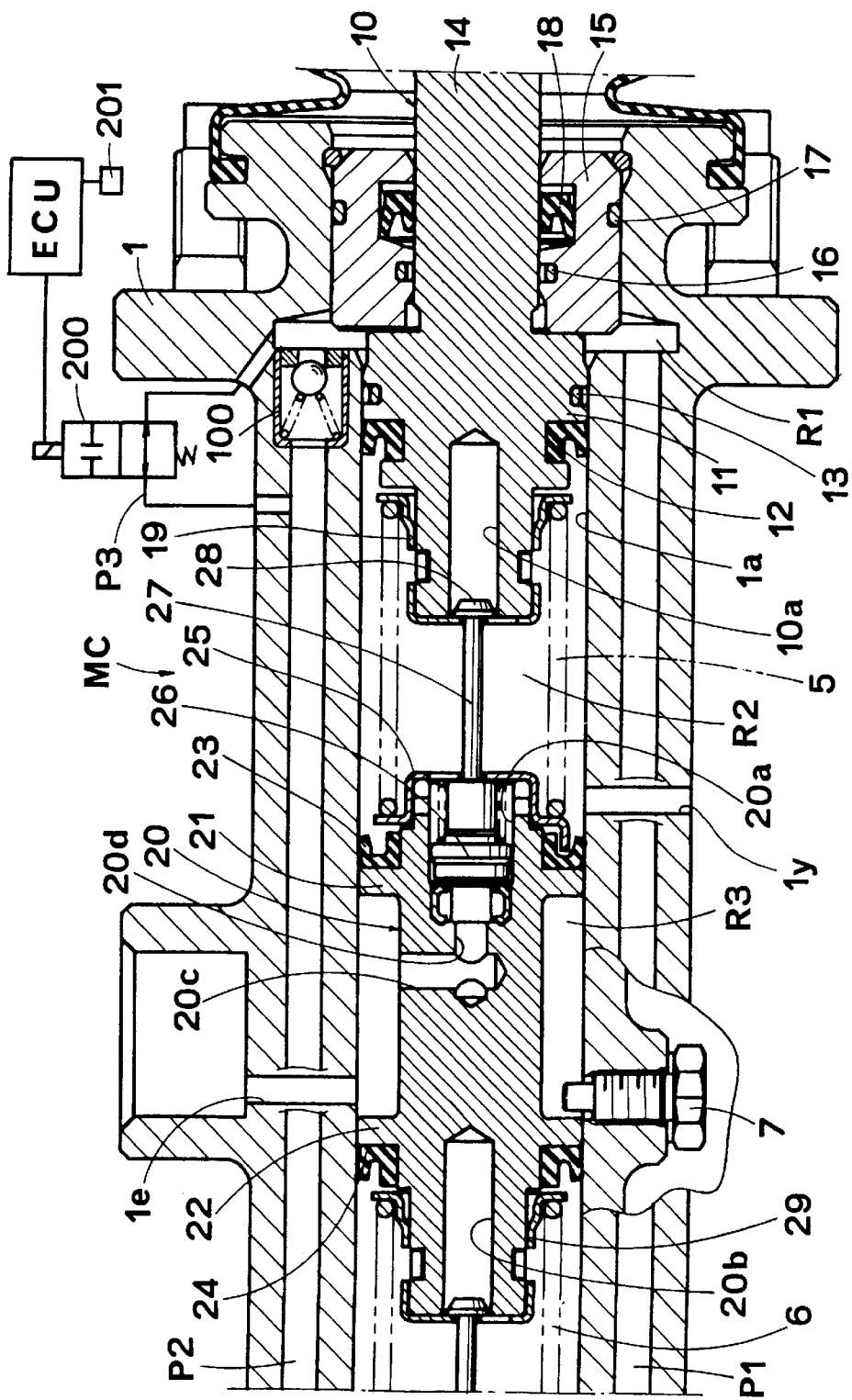
FIG. 12 is an enlarged sectional view of a master cylinder in the hydraulic brake apparatus of the further embodiment of the present invention.
Figure 13:
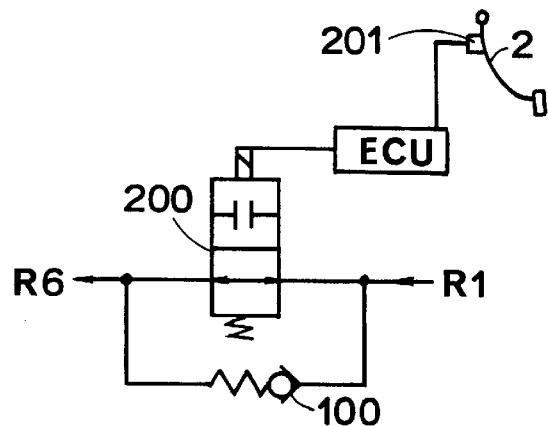
FIG. 13 is a diagram showing an embodiment of a pressure restriction device according to the further embodiment of the present invention.

FIGS. 11 and 12 show a further embodiment of the present invention, wherein a relief valve 100, which serves as the pressure decreasing means according to the present invention, is disposed in the passage P2 at a portion thereof connected to the power chamber R1, and a normally open two-port two-position electromagnetic valve (solenoid valve) 200, which serves as the valve means according to the present invention, is disposed in a passage P3 which is connected to the passage P2 in parallel with the relief valve 100. Those relief valve 100 and solenoid valve 200 serve as the pressure restriction means according to the present invention. The solenoid valve 200 is connected to an electronic control unit ECU, and controlled thereby to be opened or closed in response to operation of the brake pedal 2. According to the present embodiment, a stroke sensor 201 is provided for detecting a stroke of the brake pedal 2, and its output signal is fed into the electronic control unit ECU, in which the depressing speed of the brake pedal 2 is detected, as shown in FIG. 13 which illustrates those devices especially used for the present embodiment. Instead of the stroke sensor 201, a pressure sensor (not shown), a depressing force sensor (not shown) for detecting the depressing force of the brake pedal 2, or wheel speed sensors (not shown) may be employed. The remaining structure of the present embodiment is substantially the same as the embodiment as described in FIGS. 1–7, so that its explanation will be omitted.

Figure 14:
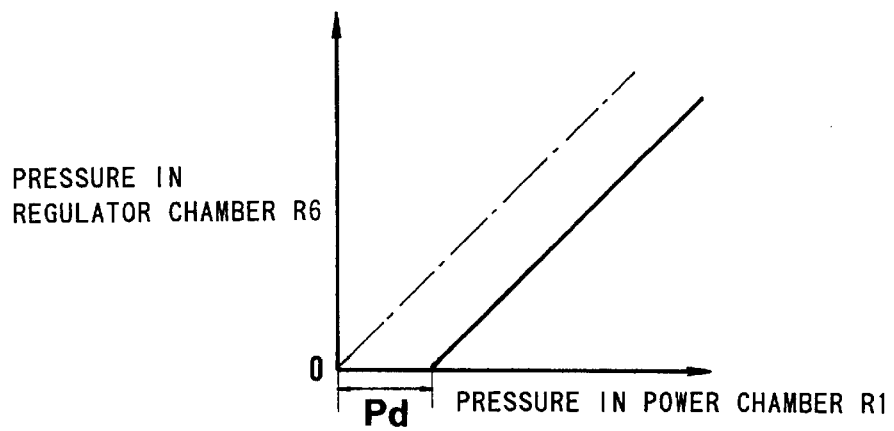
FIG. 14 is a diagram showing a characteristic of a relief valve according to the further embodiment of the present invention.

According to the hydraulic pressure control apparatus of the embodiment as shown in FIGS. 11 and 12, the solenoid valve 200 is normally placed in its open position to communicate the power chamber R1 with the regulator chamber R6 through the passage P3. When the electronic control unit ECU determines that the depressing speed of the brake pedal 2 has exceeded a predetermined value, the solenoid valve 200 is placed in its closed position to shut off the passage P3. Consequently, the power chamber R1 is communicated with the regulator chamber R6 only through the relief valve 100 having a characteristic as indicated by a solid line in FIG. 14. As a result, the hydraulic pressure in the regulator chamber R6 increases in accordance with a linear relationship with the hydraulic pressure in the power chamber R1, with a predetermined pressure Pd delayed comparing with a characteristic as indicated by a one-dotted chain line in FIG. 14. Therefore, a hydraulic pressure characteristic as indicated by a broken line in FIG. 15 can be obtained. That is, a first brake pressure characteristic K1 is provided in accordance with pressure receiving area of the control piston 30 in the regulator chamber R6, and a second brake pressure characteristic K2 is provided by the resilient member 70 to obtain a desired servo characteristic.

When the brake pedal 2 is depressed rapidly, and the operating speed of the brake pedal 2, which is detected on the basis of the output signal of the stroke sensor 201, is determined by the control unit ECU to have exceeded a predetermined value, the solenoid valve 200 is placed in its closed position, to cut off the communication between the power chamber R1 and the regulator chamber R6. Thus, according to the present embodiment, the stroke sensor 201 and the control unit ECU serve as the rapid operation detecting means of the present invention. After the solenoid valve 200 was placed in its closed position, the power pressure fed into the power chamber R1 from the auxiliary pressure source 40 through the passage P1 is transmitted to the regulator chamber R6 through the relief valve 100. Consequently, the hydraulic pressure characteristic indicates a steep gradient K3 of building-up transient as indicated by a broken line in FIG. 15 until the relief valve 100 was opened, and the hydraulic pressure in the regulator chamber R6 is held to be relatively low after the relief valve 100 is opened, so that it indicates a relatively gentle gradient K4, and finally it indicates the second gradient K2. The gradient K4 can be set on the basis of the property of the relief valve 100.

Under the braking condition as described above, when the depressing force applied to the brake pedal 2 is released, the braking force is reduced proportionally, while it is held to be of the predetermined value when the solenoid valve 200 is placed in its closed position. When the brake pedal 2 is released, it is determined by the control unit ECU that the brake pedal 2 has been released, on the basis of the output signal of the stroke sensor 201. As a result, the solenoid valve 200 is placed in its original open position, so that the braking force will be released immediately.

Figure 15:
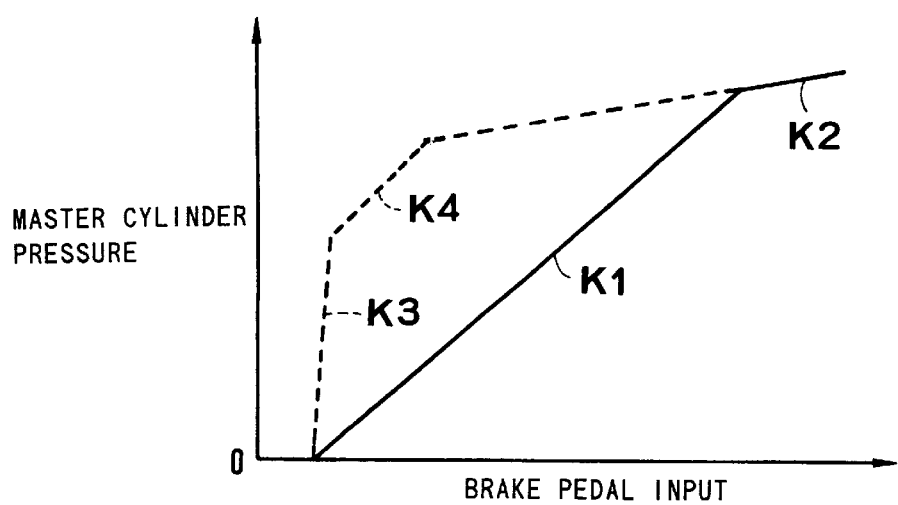
FIG. 15 is a diagram showing a hydraulic pressure characteristic of the further embodiment of the present invention.
Figure 16:
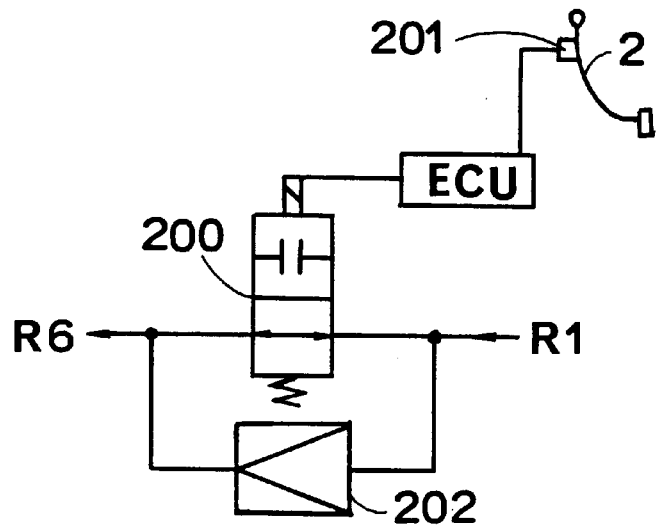
FIG. 16 is a diagram showing another embodiment of the pressure restriction device according to the further embodiment of the present invention.
Figure 17:
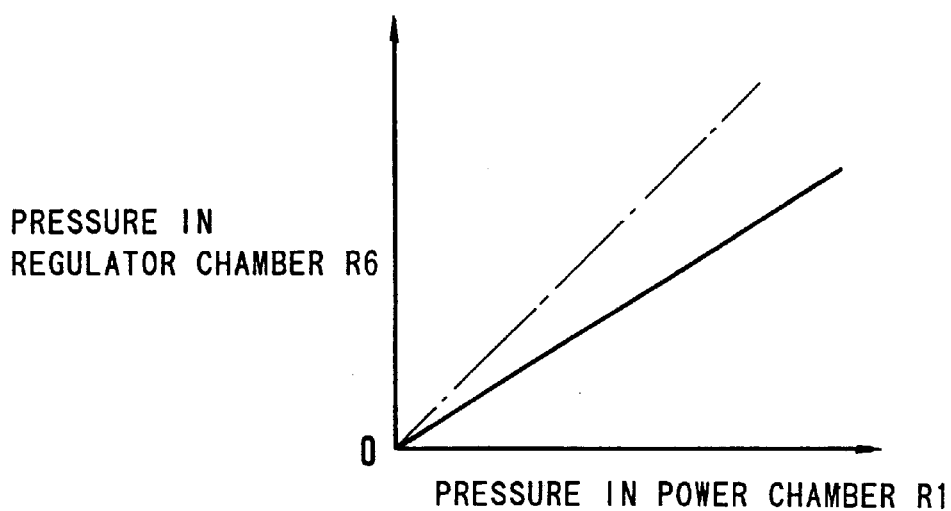
FIG. 17 is a diagram showing a characteristic of a proportional pressure decreasing mechanism according to the further embodiment of the present invention.
Figure 18:
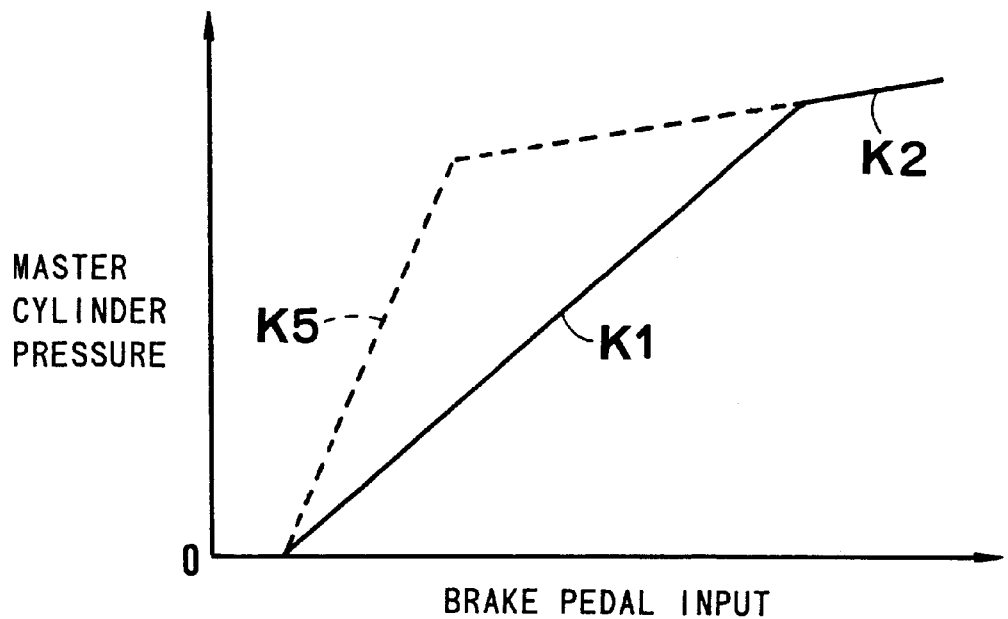
FIG. 18 is a diagram showing a hydraulic pressure characteristic of another embodiment of the pressure restriction device in the further embodiment of the present invention.

FIG. 16 shows another embodiment of the pressure restriction means according to the present invention, wherein a proportional pressure decreasing mechanism 202 is disposed in parallel with the solenoid valve 200. As the proportional pressure decreasing mechanism 202, is used a known proportioning valve (not shown) which has a characteristic as indicated by a solid line in FIG. 17, wherein the hydraulic pressure in the regulator chamber R6 increases in accordance with a linear relationship with the hydraulic pressure in the power chamber R1, varying at a more gentle gradient than that of an ordinary characteristic as indicated by a one-dotted chain line in FIG. 17. In the normal braking operation, therefore, the first brake pressure characteristic K1 and second brake pressure characteristic K2 are provided as indicated by a solid line in FIG. 18. When the brake pedal 2 is depressed rapidly, and the speed of depression of the brake pedal 2 is determined by the control unit ECU to exceed the predetermined value, the solenoid valve 200 is placed in its closed position, the power chamber R1 and the regulator chamber R6 can be communicated with each other only through the proportional pressure decreasing mechanism 202. In this case, the hydraulic pressure characteristic indicates a gradient K5, which is more gentle than that of the characteristic K3 as shown in FIG. 15, but steeper than that of the normal braking characteristic, and indicates the second gradient K2 thereafter, as indicated by a broken line in FIG. 18.

Figure 19:
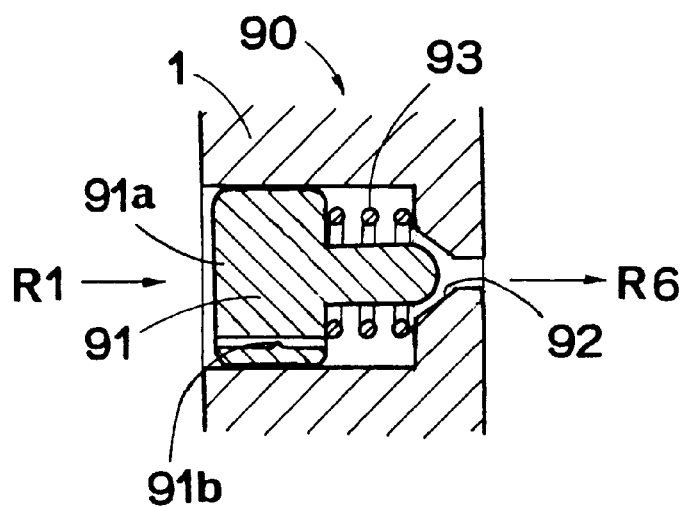
FIG. 19 is a sectional view of a cut-off valve according to the further embodiment of the present invention.

As for the valve means in the pressure restriction means of the present invention, a cut-off valve 90 as shown in FIG. 19 may be employed instead of the solenoid valve 200. The cut-off valve 90 includes a pressure receiving portion 91*a* communicated with the power chamber R1, a valve member 91 formed with an orifice 91*b*, a valve seat 92 communicated with the regulator chamber R6, and a spring 93 for biasing the valve member 91 away from the valve seat 92. Therefore, normally, the power chamber R1 is communicated with the regulator chamber R6 through the orifice 91*b* of the valve member 91 and the valve seat 92. Once the power pressure is discharged from the poppet valve mechanism 60 to increase the hydraulic pressure in the power output chamber R8 rapidly, a pressure difference will be caused by the orifice 91*b* between the power chamber R1 and the regulator chamber R6. Accordingly, the valve member 91 will be forced to be seated on the valve seat 92 against the biasing force of the spring 93, so that the communication between the power chamber R1 and the regulator chamber R6 will be cut off. In the case where the cut-off valve 90 is used, however, it is necessary to combine it with the proportioning pressure decreasing mechanism 202 which can decrease the pressure in a returning step of the valve 90.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for applying braking force to each wheel of a vehicle in response to depression of a manually operated braking member comprising:

a cylinder body mounted on said vehicle;

a reservoir for storing brake fluid;

a master cylinder having a master piston slidably received in said cylinder body to define a pressure chamber ahead of said master piston and a power chamber behind said master piston, the brake fluid in said reservoir being fed into said pressure chamber, and said master piston being moved in response to operation of said manually operated braking member to discharge hydraulic brake pressure from said pressure chamber;

an auxiliary pressure source for pressurizing the brake fluid in said reservoir to discharge power pressure of a predetermined value;

a control piston slidably disposed in said cylinder body ahead of said master piston to be movable in response to movement of said master piston, said control piston defining ahead thereof a regulator chamber, and exposing a rear end thereof to said pressure chamber;

a first passage for communicating said auxiliary pressure source with said power chamber;

a second passage for communicating said power chamber with said reservoir through said regulator chamber;

pressure increase valve means disposed in said first passage for opening or closing said first passage in response to movement of said control piston; and pressure decrease valve means disposed in said second passage for opening or closing said second passage in response to movement of said control piston.

2. A hydraulic brake apparatus as set forth in claim 1, wherein said master piston, control piston, pressure decrease valve means and pressure increase valve means are aligned along a common axis in said cylinder body, disposing said pressure decrease valve means between said regulator chamber and said reservoir, and defining said regulator chamber between said control piston and said pressure decrease valve means.

3. A hydraulic brake apparatus as set forth in claim 1, further comprising one way valve means for allowing the brake fluid to flow from said pressure increase valve means to said power chamber and preventing the reverse flow.

4. A hydraulic brake apparatus as set forth in claim 3, further comprising a modulator connected with one end of said one way valve means to be connected with said pressure increase valve means, said modulator being adapted to supply the hydraulic brake pressure discharged from said pressure increase valve means into wheel brake cylinders of said vehicle in accordance with the driving conditions of said vehicle.

5. A hydraulic brake apparatus as set forth in claim 3, wherein said one way valve means is a check valve disposed in said first passage at a portion thereof opening to said power chamber.

6. A hydraulic brake apparatus as set forth in claim 3, wherein said master piston, control piston, pressure decrease valve means and pressure increase valve means are aligned along a common axis in said cylinder body, defining said regulator chamber between said control piston and said pressure decrease valve means, said power chamber being communicated with said reservoir through said regulator chamber when said pressure decrease valve means opens said second passage.

7. A hydraulic brake apparatus as set forth in claim 1, further comprising pressure restriction means for restricting the hydraulic brake pressure fed from said power chamber into said regulator chamber in response to operation of said manually operated braking member.

8. A hydraulic brake apparatus as set forth in claim 7, wherein said pressure restriction means comprises:

valve means disposed in said second passage for normally opening said second passage, and closing said second passage when said manually operated braking member is operated rapidly; and pressure decreasing means disposed in parallel with said valve means for decreasing the hydraulic brake pressure fed from said power chamber into said regulator chamber in accordance with a predetermined characteristic.

9. A hydraulic brake apparatus as set forth in claim 8, wherein said valve means comprises:

rapid operation detecting means for detecting operation of said manually operated braking member to output a cut-off signal when said manually operated braking member is operated at a speed greater than a predetermined speed; and a normally open electromagnetic valve for closing said second passage when said rapid operation detecting means outputs the cut-off signal.

10. A hydraulic brake apparatus as set forth in claim 8, wherein said valve means includes a cut-off valve comprising a valve seat formed between said power chamber and said regulator chamber, a valve member with one end thereof exposed to said power chamber and with the other end thereof seated on said valve seat, and a spring for urging said valve member away from said valve seat, said valve member being formed with an orifice for communicating said power chamber with said regulator chamber.

11. A hydraulic brake apparatus as set forth in claim 8, wherein said pressure decreasing means includes a relief valve for communicating therethrough when the hydraulic brake pressure fed from said power chamber into said regulator chamber exceeds a predetermined pressure.

12. A hydraulic brake apparatus as set forth in claim 8, wherein said pressure decreasing means includes a proportional pressure decreasing mechanism for decreasing the hydraulic brake pressure discharged therefrom substantially in proportion to the hydraulic brake pressure fed thereinto.

13. A hydraulic brake apparatus as set forth in claim 7, wherein said master piston, control piston, pressure decrease valve means and pressure increase valve means are aligned along a common axis in said cylinder body, defining said regulator chamber between said control piston and said pressure decrease valve means, to communicate said power chamber with said regulator chamber and said pressure increase valve means, and wherein said pressure restriction means is disposed in said second passage.

14. A hydraulic brake apparatus as set forth in claim 13, wherein said pressure restriction means comprises:

valve means disposed in said second passage for normally opening said second passage, and closing said second passage when said manually operated braking member is operated rapidly; and pressure decreasing means disposed in parallel with said valve means for decreasing the hydraulic brake pressure fed from said power chamber into said regulator chamber in accordance with a predetermined characteristic.

15. A hydraulic brake apparatus as set forth in claim 1, further comprising pressure control means disposed between said power chamber and said regulator chamber in said second passage for controlling the pressure transmitted from said power chamber to said regulator chamber on the basis of a predetermined characteristic.

* * * * *